United States Patent Office 3,129,927
Patented Apr. 21, 1964

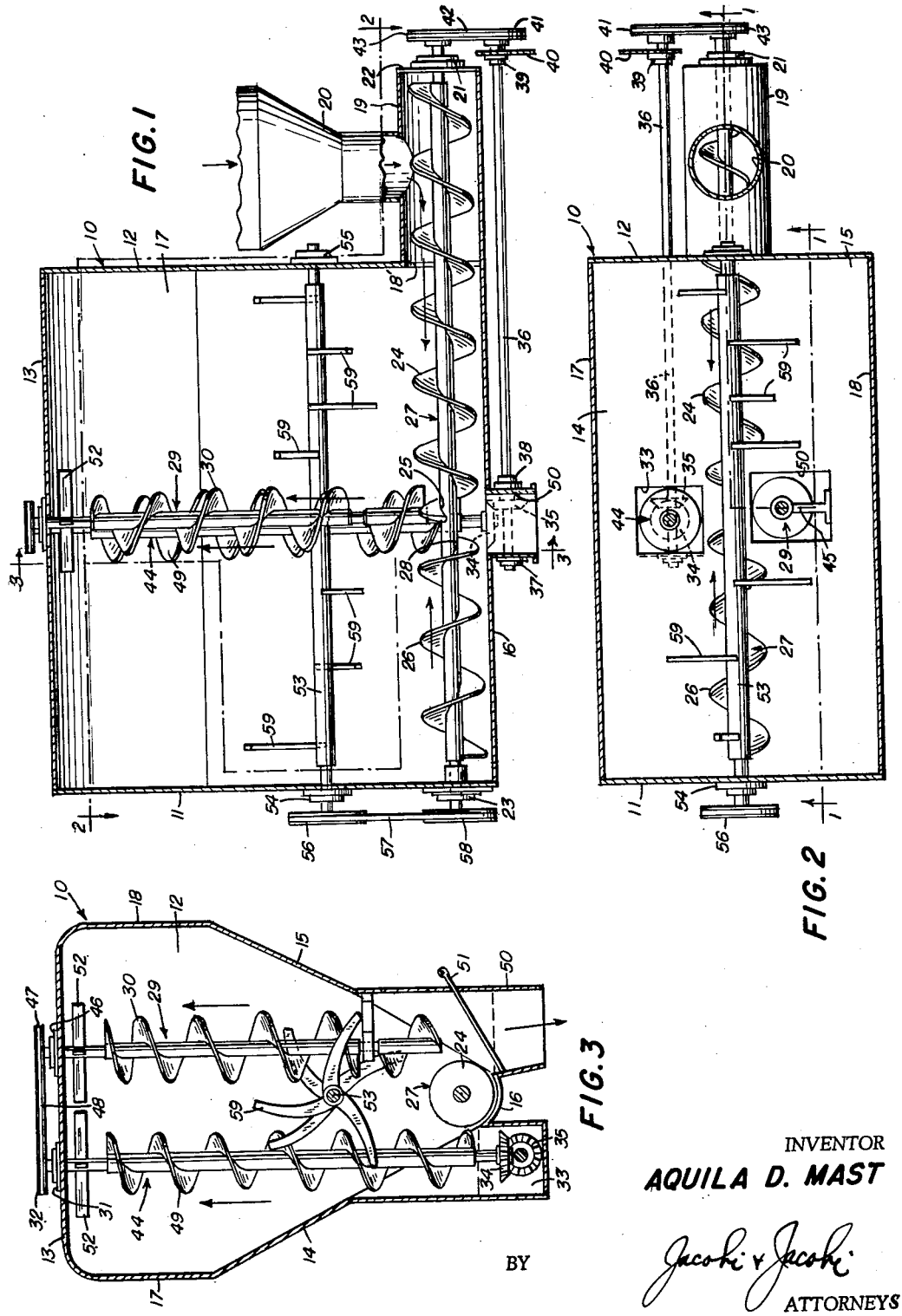

3,129,927
MIXING APPARATUS FOR FLUENT MATERIAL
Aquila D. Mast, 1316 Clayton Road, Lancaster, Pa.
Filed Nov. 3, 1960, Ser. No. 66,954
5 Claims. (Cl. 259—6)

This invention relates to the treatment of material and more particularly to a mixing apparatus for fluent material in which different types of such material may be mixed or in which a single type of material may be mixed with a dry or liquid additive which is thoroughly and adequately dispersed throughout the mass of material.

While the apparatus of this invention may be utilized for mixing almost any type of fluent material, the apparatus is primarily intended to be utilized for the mixing of livestock feed in which various types of feed may be mixed together or in which a single type of feed may be mixed with a suitable additive, such as molasses or other liquid. For proper quality, it is imperative that such feeds be thoroughly mixed and furthermore, in present day feed preparation operations it is frequently customary to utilize a portable or mobile feed processing plant which includes feed grinding apparatus, as well as a suitable mixing apparatus. Consequently, the mixing apparatus must be relatively simple and light in weight in order that the same may be accommodated on a suitable vehicle and furthermore, the apparatus should be capable of operating under relatively adverse conditions, such as the presence of relatively large quantities of dust or grit without undue wear or frequent breakdown which would materially reduce the production capacity of the apparatus.

In feed preparation operations of the type under consideration it is customary after mixing of the feed to deposit the same in bags or other containers for storage and the mixing apparatus is normally provided with a chute for directing the feed into the bag or other container and the chute is normally provided with a slide for controlling the flow of material therethrough. Since the chute is located at or adjacent the bottom of the mixing chamber, normally the entire weight of the material in the chamber presses downwardly upon the slide in the chute thereby rendering operation of such slide somewhat difficult and accordingly, the present invention contemplates reducing the dead weight load on the slide in order to facilitate convenient operation thereof.

It is accordingly an object of the invention to provide a mixing apparatus for fluent material which may be conveniently and economically manufactured from readily available materials and which may be utilized for stationary operation or which may be conveniently mounted on a vehicle for mobile operation.

A further operation of the invention is the provision of a mixing apparatus for fluent material which includes a closed tank, together with means including conveyors and beaters or mixing paddles within the tank for thoroughly and adequately mixing material supplied thereto.

A still further object of the invention is the provision of a mixing apparatus for fluent material, including a closed tank with conveyors and beaters or mixing paddles disposed therein which operate to thoroughly and adequately mix material supplied thereto and to disperse such material in a substantially uniform manner throughout the interior of the tank.

Another object of the invention is the provision of a mixing apparatus for fluent material, including a closed tank and conveyors and beaters or mixing paddles disposed within the tank, there being a chute leading from the lower portion of the tank for directing material into a bag or other container and a slide in the chute for controlling flow of material therethrough and in which means is provided within the tank for reducing the dead weight load of material on the slide in order to facilitate operation thereof.

Further objects and advantages of the invention will be apparent from the following description taken in conjunction with the accompanying drawing wherein:

FIG. 1 is a longitudinal sectional view taken substantially on the line 1—1 of FIG. 2 and showing the mixing apparatus of this invention, together with the means for feeding fluent material to such apparatus;

FIG. 2 a horizontal sectional view taken substantially on the line 2—2 of FIG. 1; and FIG. 3 a transverse sectional view taken substantially on the line 3—3 of FIG. 1 and showing the arrangement of the discharge chute and slide for controlling flow of material through such chute.

With continued reference to the drawing, there is shown a mixing apparatus for fluent material constructed in accordance with this invention and which may well comprise an elongated tank 10 having vertical end walls 11 and 12, a top wall 13, upwardly diverging sidewalls 14 and 15 and an arcuate bottom wall 16. As shown in FIG. 3, the upwardly diverging sidewalls 14 and 15 terminate intermediate the height of the tank 10 and the remaining portion of the sidewalls of the tank are formed by vertical portions 17 and 18. It is to be understood, however, that this specific configuration of the tank, particularly with regard to the sidewalls is for illustrative purposes only and diverging sidewalls extending the full height of the tank may be utilized, if desired, and also if desired, the end walls 11 and 12 might diverge upwardly, but for the preferred form of the invention, the tank is constructed substantially as shown in the drawing and described above. Also as best shown in FIG. 3, it is to be noted that the arcuate bottom wall 16, together with the adjacent diverging sidewalls 14 and 15 provide a trough at the bottom of the tank 10, it being obviously that fluent material within the tank 10 will gravitate downwardly toward such trough at the bottom of the tank.

Disposed in the trough formed by the bottom wall 16 and diverging sidewalls 14 and 15 is a horizontal screw conveyor 27 extending through an opening 18' in the end wall 12 and into a tubular housing 19 extending exteriorly of the end wall 12. The housing 19 may communicate with a hopper 20 for supplying fluent material to the interior of the housing 19 or if desired, any other supply means for fluent material may be disposed in such a manner as to feed such material into the housing 19. The screw conveyor 27 may be rotatably mounted in a bearing 21 provided on the end wall 22 of the housing 19 and the opposite end of the screw conveyor 27 may be rotatably mounted in a bearing 23 provided on the end wall 11 of the tank 10. A spiral vane 24 is provided on the screw conveyor 27 extending into the housing 19 and as will be seen from an inspection of FIG. 1, the vane 24 terminates at a point 25 intermediate the length of the tank 10. The opposite end of the screw conveyor 27 is provided with a spiral vane 26 having a twist opposite to that of the vane 24 and as will be seen from an inspection of FIG. 1, the vane 26 extends from a point adjacent the end wall 11 to a point 28 intermediate the length of the tank 10 and adjacent the point 25 on the vane 24. As a result of this structure, rotation of the screw conveyor 27 will operate to feed material from the housing 19 into the tank 10 and toward the intermediate point 25 thereof and at the same time, due to the opposite twist of the vane 26 material will be conveyed from the vicinity of the end wall 11 toward the end 28 of such vane 26 at an intermediate point in the tank 10. Consequently, as a result of the action of screw conveyor 27, material in the tank 10 will tend to collect at an intermediate point in such tank at the inner ends of the vanes on the conveyor 27.

As best shown in FIGS. 1 and 3, a vertically extending spiral conveyor 44 is disposed in the tank 10 adjacent the intermediate point therein defined by the ends 25 and 28 of the vanes 24 and 26 on the spiral conveyor 27 and the vertical conveyor 44 is provided with a vane 49 which serves to convey material upwardly in the tank 10 upon rotation of the conveyor 44. The upper end of the conveyor 44 extends through a bearing 31 mounted on the top wall 13 of the tank 10 and on the upper end of the conveyor 29 there is fixed a pulley or sprocket 32 for a purpose to be presently described. The lower end of the conveyor 44 terminates in a well 33 provided in the bottom of the tank 10 and fixed to the lower end of the conveyor 44 is a bevel gear 34 which meshes with a gear 35 fixed to a shaft 36 rotatably mounted in bearings 37 and 38 on the walls of the well 33. The opposite end of the shaft 36 may be rotatably mounted in a bearing 39 carried by a bracket 40 suitably supported from the tank 10 or some adjacent structure and fixed to the end of the shaft 36 is a pulley or sprocket 41 over which is trained a belt or chain 42 which in turn is trained over a pulley or sprocket 43 fixed to the outer end of the horizontal conveyor 27. Consequently, driving of the conveyor 27 will result in driving the vertical conveyor 44.

A second vertical conveyor 29 is mounted in the tank 10 at the opposite side of the horizontal conveyor 27 from the vertical conveyor 44 and the axes of conveyors 29 and 44 lie substantially in a common plane disposed transversely of the tank 10. Consequently, the second vertical conveyor 29 is located at the intermediate point in the tank 10 defined by the ends 25 and 28 of the vanes 24 and 26 on the horizontal conveyor 27. The lower end of the conveyor 29 may be rotatably supported by a bracket 45 extending inwardly from the sidewall of a chute 50 and the upper end of the conveyor 29 is rotatably mounted in a bearing 46 secured to the top wall 13 of the tank 10, the upper end of the conveyor 29 having a pulley or sprocket 47 fixed thereto for engaging a belt or chain 48 which is trained over the pulley or sprocket 32 on the upper end of the conveyor 44. Consequently, the second vertical conveyor 29 is driven through the belt or chain 48 from the first vertical conveyor 44. The vane 30 on the vertical conveyor 29 is so disposed as to convey material upwardly in the tank 10 upon rotation of such conveyor.

Extending downwardly from the sidewall 15 and bottom wall 16 directly below the lower end of the second vertical conveyor 29 is the chute 50 which is provided for directing material from the tank 10 into a bag or other container for receiving the same. Flow of material through the chute 50 is controlled by a slide 51 which is shown in the closed position in FIG. 3, but which may be pulled outwardly to permit flow of material through the chute 50 and into a bag or other container disposed therebeneath. Since the vertical conveyor 29 is disposed directly above the upper surface of the slide 51 rotation of the second vertical conveyor 29 will serve to move a portion of the material normally engaging the slide 51 upwardly, thereby reducing the dead weight load of material on the slide 51 and facilitating operation of such slide which would be relatively difficult with the full weight of the material in the tank 10 exerting a downward force thereon. Consequently, the vertical conveyor 29 performs the dual function of conveying and mixing material in the tank 10 and also of reducing the load on the slide 51 to facilitate operation thereof.

It will be noted that the vanes 30 and 49 of the vertical conveyors 29 and 44 terminate in spaced relation to the top wall 13 of the tank 10 and as shown in FIGS. 1 and 3 of the drawing, a plurality of radial arms 52 are provided on the conveyors 29 and 44 between the upper ends of the vanes 30 and 49 and the top wall 13 and such radial arms serve to spread material conveyed upwardly by the conveyors 29 and 44 thereby moving such material away from the discharge end of the conveyors.

In order to provide for thorough and adequate mixing of fluent material in the tank 10, a horizontal shaft 53 is rotatably mounted in bearings 54 and 55 secured to the end walls 11 and 12 respectively of the tank 10 and fixed to the outer end of the shaft 53 is a pulley or sprocket 56 engaging a belt or chain 57 which is trained over a pulley or sprocket 58 fixed to the horizontal conveyor 27. Consequently, rotation of the horizontal conveyor 27 will result in driving the horizontal shaft 53. Fixed to the shaft 53 are a plurality of axially spaced radially extending bars 59 and as will be seen from an inspection of FIGS. 1 and 2, such bars are spaced throughout the length of shaft 53. As shown in FIG. 3, the bars 59 are spaced angularly around the shaft 53 and also the bars 59 are curved in a direction opposite to the direction of rotation of the shaft 53 in order to provide a wiping action between the bars 59 and the material in the tank 10 to prevent adherence of such material to the bars 59. It is further to be noted that the shaft 53 and bars 59 carried thereby are located in the tank 10 below the normal level of material therein and consequently, the bars 59 operate to agitate and thoroughly mix such material and it is also to be noted that the bars 59 perform no conveying function whatsoever, but are provided solely for the purpose of agitating and mixing the contents of the tank 10.

In operation, material is fed from the hopper 20 or other suitable source into the housing 19 and the vane 24 on the spiral conveyor 27 operates to feed such material into the tank 10 and toward the vertical conveyors 29 and 44. At the same time, material within the tank 10 is conveyed by the vane 26 on the horizontal conveyor 27 from the side of the tank 10 closed by the end wall 11 toward the vertical conveyors 29 and 44. Such vertical conveyors operate to convey the material delivered thereto by the conveyor 27 upwardly in the tank 10 and upon reaching the upper level of material in the tank, the material conveyed upwardly will flow outwardly and away from the vertical conveyors 29 and 44 toward the end walls 11 and 12 and the sidewalls 17 and 18. This outward movement of the material conveyed upwardly by the vertical conveyors 29 and 44 will be materially facilitated by the radially extending arms 52 on the upper ends of the conveyors 29 and 44. The material will thus follow a circuitous path in the tank 10 from the intermediate point thereof at the lower ends of the vertical conveyors 29 and 44 upwardly in the tank and outwardly toward the end and sidewalls, the material flowing downwardly toward the horizontal conveyor 27 to again be moved inwardly to the lower ends of the vertical conveyors 29 and 44. This mixing action of the material in the tank 10 caused by the circuitous flow thereof is further enhanced by the mixing and beating action provided by the bars 59 on the horizontal shaft 53 and, since such bars perform no conveying function, the circuitous path of movement of the material in the tank 10 will in no way be interrupted thereby and proper mixing of such material will result.

When the material in the tank 10 has been properly mixed, the same may be discharged therefrom and stored in bags or suitable containers by placing such bags or containers beneath the chute 50 and upon opening the slide 51, the material in the tank 10 will be discharged into the bag or other container. As mentioned above, operation of the vertical conveyor 29 operates to reduce the dead weight load on the slide 51 thereby permitting convenient and relatively easy operation thereof. Furthermore, the provision of the two vertical conveyors 29 and 44 permits a more even distribution of material in the tank 10 than would be the case were a single vertical conveyor provided and it is also believed that such vertical conveyors materially enhance the mixing operation of the bars 59 on the horizontal shaft 53.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. Mixing apparatus for fluent material, said apparatus comprising an elongated tank having vertical end walls, a top wall, upwardly diverging sidewalls and an arcuate bottom wall, said bottom wall and adjacent sidewalls providing a trough, a horizontal screw conveyor disposed in said trough, one end of said conveyor extending through one end wall, means to supply fluent material to said one end of said conveyor for feeding into said tank, the vane on said one end of said conveyor terminating at an intermediate point in said tank, the vane on the other end of said conveyor extending from said intermediate point to the other end wall and having a twist opposite to that on said one end to convey material from said other end wall toward said intermediate point, a vertically extending spiral conveyor at said intermediate point disposed on one side of said horizontal conveyor and terminating below said top wall for conveying material upwardly, a discharge chute at said intermediate point in the sidewall on the opposite side of said horizontal conveyor from said vertical conveyor, a slide in said chute for closing the same, a second vertically extending spiral conveyor at said intermediate point disposed directly above and in axial alignment with said chute on the opposite side of said horizontal conveyor from said first vertical conveyor and terminating below said top wall for conveying material upwardly, the lower end of said second vertical conveyor terminating adjacent the upper surface of said slide to reduce the dead weight load of fluent material on said slide, a plurality of radial arms on the upper end of each vertical conveyor adjacent said top wall to spread material conveyed upwardly by said vertical conveyors, a horizontal shaft extending between said end walls intermediate the height of said tank, a plurality of axially spaced radially extending bars on said shaft for agitating and mixing material in said tank, said bars being at all times disposed below the level of material in said tank and means to drive said conveyors and said shaft.

2. Mixing apparatus as defined in claim 1, in which the bars are curved in a direction opposite to the direction of rotation of said shaft to provide a wiping action and prevent adherence of material to said bars.

3. Mixing apparatus for fluent material, said apparatus comprising an elongated tank having end walls, a top wall, sidewalls and an arcuate bottom wall, said bottom wall and adjacent sidewalls providing a trough, a horizontal screw conveyor disposed in said trough, one end of said conveyor extending through one end wall, means to supply fluent material to said one end of said conveyor for feeding into said tank, the vane on said one end of said conveyor terminating at an intermediate point in said tank, the vane on the other end of said conveyor extending from said intermediate point to the other end wall and having a twist opposite to that on said one end to convey material from said other end wall toward said intermediate point, a vertically extending spiral conveyor at said intermediate point disposed on one side of said horizontal conveyor for conveying material upwardly, a discharge chute at said intermediate point in the sidewall on the opposite side of said horizontal conveyor from said vertical conveyor, a slide in said chute for closing the same, a second vertically extending spiral conveyor at said intermediate point disposed directly above and in axial alignment with said chute on the opposite side of said horizontal conveyor from said first vertical conveyor for conveying material upwardly, the lower end of said second vertical conveyor terminating adjacent the upper surface of said slide to reduce the dead weight load of fluent material on said slide, a horizontal shaft extending between said end walls intermediate the height of said tank, a plurality of axially spaced radially extending bars on said shaft for agitating and mixing material in said tank, said bars being at all times disposed below the level of material in said tank and means to drive said conveyors and said shaft.

4. Mixing apparatus for fluent material, said apparatus comprising an elongated tank having end walls, a top wall, sidewalls and a bottom wall, said bottom wall and adjacent sidewalls providing a trough, a horizontal screw conveyor disposed in said trough, means to supply said fluent material to said tank, the vane on one end of said conveyor terminating at an intermediate point in said tank for feeding material thereto, the vane on the other end of said conveyor extending from said intermediate point toward the adjacent end wall and having a twist opposite to that on said one end to convey material from said adjacent end wall toward said intermediate point, a vertically extending spiral conveyor at said intermediate point disposed on one side of said horizontal conveyor for conveying material upwardly, a discharge chute in said tank at said intermediate point on the opposite side of said horizontal conveyor from said vertical conveyor, a slide in said chute for closing the same, a second vertically extending spiral conveyor at said intermediate point disposed directly above and in axial alignment with said chute on the opposite side of said horizontal conveyor from said first vertical conveyor for conveying material upwardly, the lower end of said second vertical conveyor terminating adjacent the upper surface of said slide to reduce the dead weight load of fluent material on said slide, a horizontal shaft extending between said end walls intermediate the height of said tank, a plurality of axially spaced radially extending bars on said shaft for agitating and mixing material in said tank, said bars being at all times disposed below the level of material in said tank and means to drive said conveyors and said shaft.

5. Mixing apparatus for fluent material, said apparatus comprising an elongated tank having end walls, sidewalls and a bottom wall, said bottom wall and adjacent sidewalls providing a trough, a horizontal screw conveyor disposed in said trough, the vane on one end of said conveyor terminating at an intermediate point in said tank for feeding material thereto, the vane on the other end of said conveyor extending from said intermediate point toward the adjacent end wall and having a twist opposite to that on said one end to convey material from said adjacent end wall toward said intermediate point, a vertically extending spiral conveyor at said intermediate point disposed on one side of said horizontal conveyor for conveying material upwardly, a discharge chute in said tank at said intermediate point on the opposite side of said horizontal conveyor from said vertical conveyor, a slide in said chute for closing the same, a second vertically extending spiral conveyor at said intermediate point disposed directly above and in axial alignment with said chute on the opposite side of said horizontal conveyor from said first vertical conveyor for conveying material upwardly, the lower end of said second vertical conveyor terminating adjacent the upper surface of said slide to reduce the dead weight load of fluent material on said slide and means to drive said conveyors.

References Cited in the file of this patent

UNITED STATES PATENTS

| | | |
|---|---|---|
| 2,576,177 | Herr | Nov. 27, 1951 |
| 2,621,904 | Stauffer | Dec. 16, 1952 |
| 2,672,406 | Carney | Mar. 16, 1954 |
| 2,825,511 | Byberg | Mar. 4, 1958 |
| 2,828,112 | Kammer | Mar. 25, 1958 |